March 20, 1945.  B. M. SMITH  2,372,025
MATERIAL HANDLING APPARATUS
Filed Jan. 8, 1944  2 Sheets-Sheet 1
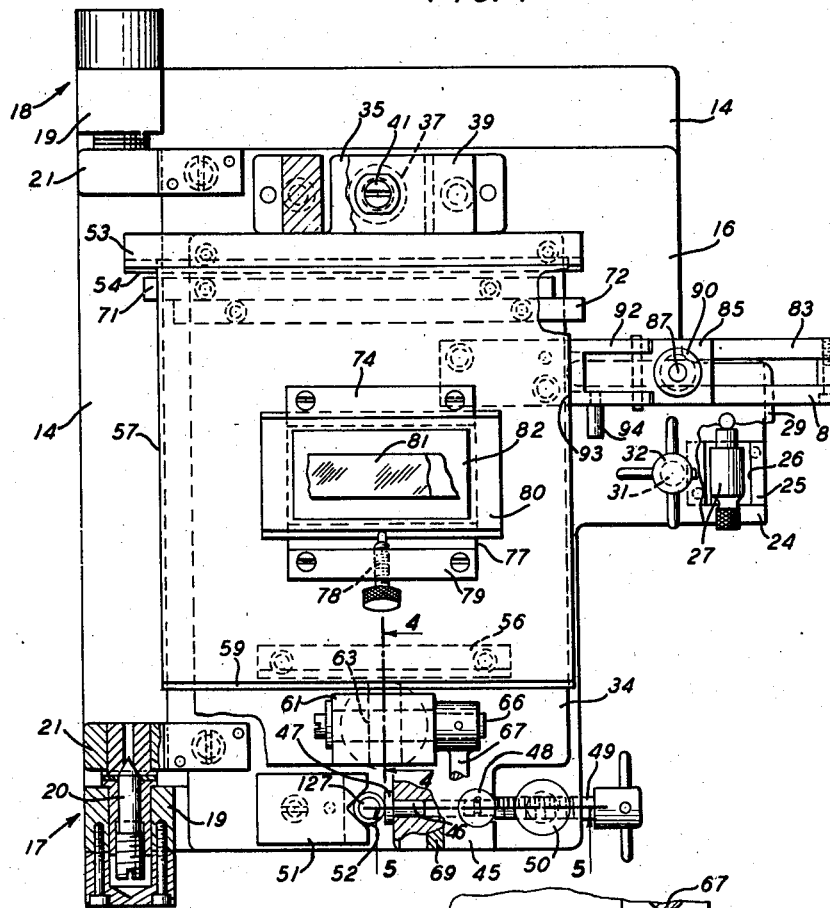
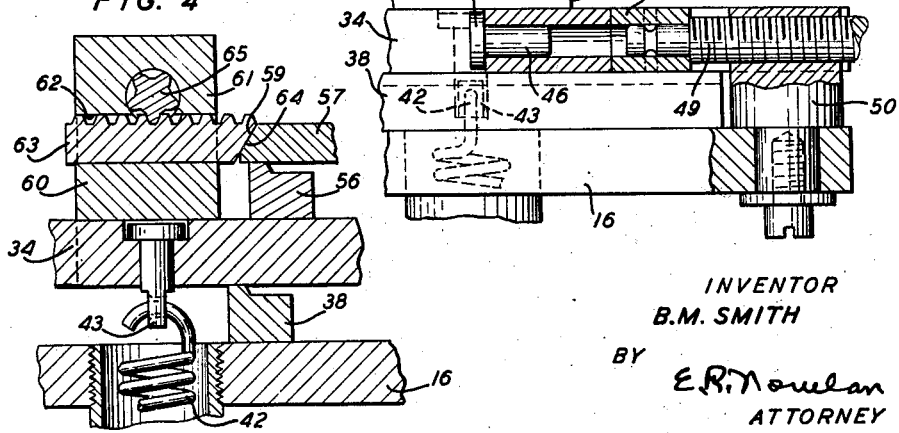
INVENTOR
B.M. SMITH
BY
E.R. Nowlan
ATTORNEY March 20, 1945.    B. M. SMITH    2,372,025
MATERIAL HANDLING APPARATUS
Filed Jan. 8, 1944    2 Sheets-Sheet 2
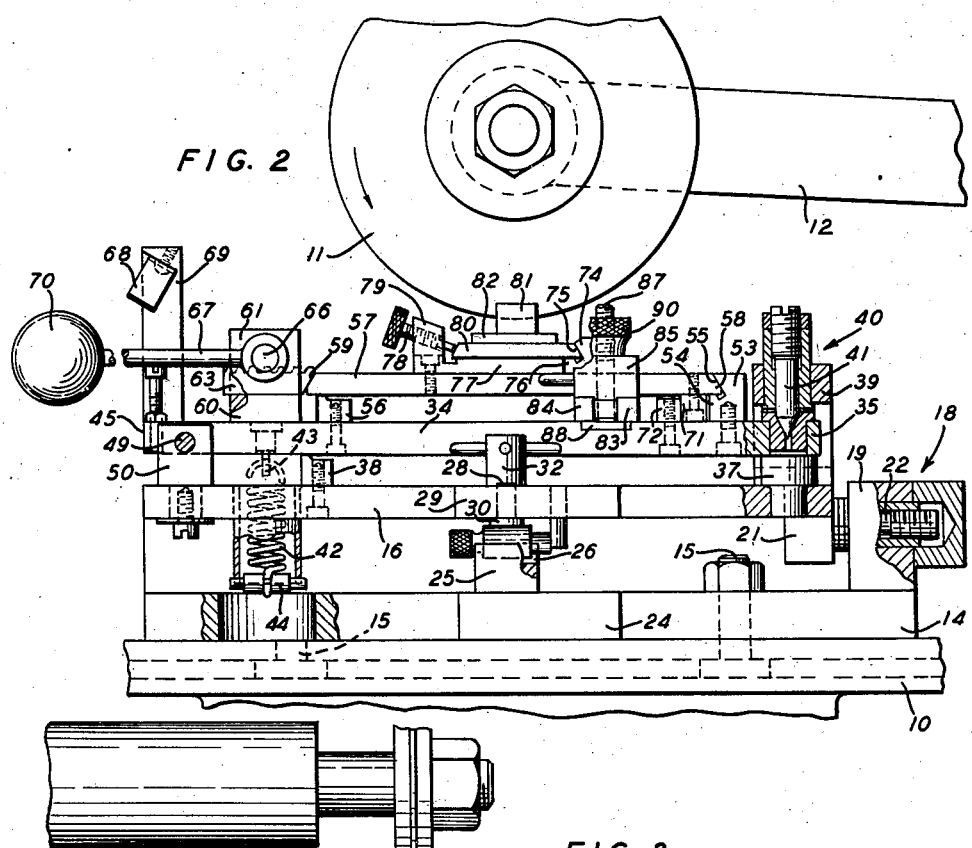
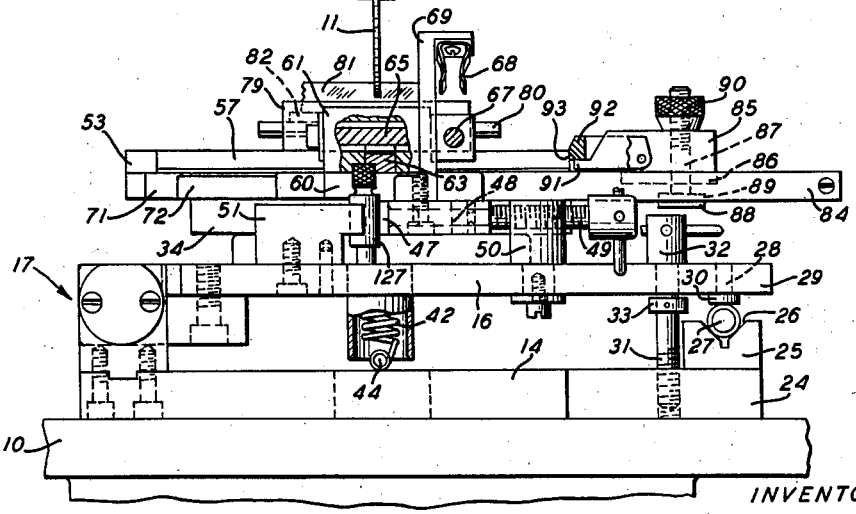
INVENTOR
B. M. SMITH
BY E. R. Nowlan
ATTORNEY Patented Mar. 20, 1945

2,372,025

UNITED STATES PATENT OFFICE 2,372,025

MATERIAL HANDLING APPARATUS

Bruce M. Smith, Haverhill, Mass., assignor to Western Electric Company, Incorporated, New York, N. Y., a corporation of New York Application January 8, 1944, Serial No. 517,611

4 Claims. (Cl. 125—12)

This invention relates to a material handling apparatus, and more particularly to work holding apparatus for a machine tool.

There are numerous instances in manufacturing industries in which it is desired to present a piece of work to a tool operating in only one fixed line or plane, e. g. a drill or a saw, in such fashion that the orientation of the work with respect to the operating axis or plane of the tool may be accurately adjusted to correspond to a predetermined relation. For example, in the manufacture of the slices of crystalline quartz used in a great variety of electrical devices and apparatus, the raw material is ordinarily first investigated by optical means to locate approximately in an irregular lump, the crystallographic axes, to determine twinning in the molecular structure, and portions suitable and unsuitable for the purpose in hand. Slabs or bars are then sawed from the material according to these determinations to make available as much of the suitable material present in the lump as possible. Further crystallographic investigation, e. g. with X-rays, is then made to determine accurately the crystallographic axes of this now homogeneous material from which accurately oriented slices are to be sawed, and such a slab or bar is then mounted on a saw table for cutting into bars or slices. Usually a test piece is cut and again studied by X-ray means, when it may be found that some minor correction of orientation, say of the order of a fraction of a degree in one or perhaps two mutually perpendicular directions, is necessary.

An object of the present invention is to provide a work holding apparatus or device for a machine tool, capable of adjusting the orientation of a piece of work held in the device with respect to the tool of the machine with an accuracy of the order of a very few minutes of angle.

With the above and other objects in view, the invention may be embodied in a work supporting device for a machine tool which device comprises a stationary base table, a tilting table pivotable on the base table about an axis parallel thereto, a V-block mounted on one of the said tables and facing the other, a plane contact face on the other table and facing the V-groove of the V-block, a cylindrical spacing element interposed between and resting against the sides of the V-groove on one side and the contact face on the other side, and work holding means mounted on the swing table.

Other objects and features of the invention will appear from the following detailed description of an embodiment thereof, taken in connection with the accompanying drawings in which the same reference numerals are applied to identical parts in the several figures and in which Fig. 1 is a plan view partly in section and with parts broken away of a work holder embodying the invention;

Fig. 2 is a view thereof in side elevation and partly in section and including a saw not shown in Fig. 1;

Fig. 3 is a view in end elevation and partly in section of the showing of Fig. 2;

Fig. 4 is an enlarged section on the line 4—4 of Fig. 1; and

Fig. 5 is an enlarged section on the line 5—5 of Fig. 1.

As herein disclosed, the invention is embodied in a device to be mounted on the horizontal bed 10 of a sawing machine having a rotary saw 11 carried on a pivotable arm 12 to be movable vertically toward and from the bed in one vertical plane only. Sawing machines of this character are well known and so only these elements of the machine which are pertinent to the present invention are shown here.

Foundation of the device of the invention is a rigid horizontal base table 14 to be secured on the bed 10 as by bolts 15. On the base table 14, a tiltable table 16 is mounted by two identically similar pivot devices 17 and 18, of which the details of 17 are shown in Fig. 1 in section. The block 19 is rigidly mounted on the base table 14 and carries the pivot pin 20 whose conical tip enters a corresponding countersunk recess in the block 21 secured to the table 16. Thus the table 16 is tiltable about the common axis of the pin 20 and the corresponding pin 22 (Fig. 2) in the device 18, which axis is horizontal and parallel to the plane of the saw 11.

At the right hand side of the base table 14 is an integral extension 24 of the base table upon the upper side of which is rigidly secured a V-block 25 having in the upper face thereof the V-groove or recess 26, whose mutually perpendicular faces are parallel to the axis of the pivot pins 20 and 22 and are hardened and ground to accuracy. In this V-groove 26 rests an accurately dimensioned and cylindrical, hardened adjustment cylinder 27. The table 16 has an integral extension 29 overlying the extension 24 of the base 14; and in the extension 29 is mounted a pin 28 having a hardened flat head 30 whose under face is ground to be plane and parallel to the axis of the pins 20 and 22, and which rests on the cylinder 27 and thereby supports the table 16.

A screw 31, having threaded engagement in the base 14 and an enlarged head 32 bearing on the table 16 and passing through a corresponding slightly oversize aperture in the table, serves to clamp the right side of the table down upon the cylinder 27. By means of a collar 33 pinned on the screw 31, a short distance below the under side of the table 16, the screw may be actuated to raise and support the right side of the table with the head 30 of the pin 28 clear of the cylinder 27, when the latter may be exchanged for another like cylinder of different diameter.

A swing table 34 having an integral rear extension 35 has the rear extension supported on a spacing member 37 mounted centrally near the rear edge in the tilting table 16, while the front portion of the swing table rests on a spacing rail 38 mounted on the tilting table near and parallel to the front edge thereof. A bridge member 39 is mounted rigidly on the tilting table at the rear thereof and spans over the extension 35 of the swing table 34. A pivotal connection, generally indicated at 40 and supported by the bridge 39, connects the swing table to be pivotable with respect to the tilting table about a vertical axis through the pin 41 of the device 40, the forward portion of the swing table being thus movable arcuately about this axis on the rail 38. A tension spring 42 connected to a member 43 mounted in the swing table 34 near the front thereof and to a member 44 mounted on the tilting table 16, serves to keep the swing table at all times snugly down on the guide rail 38.

The swing table 34 also has a forward extension 45 in the left side of which is rigidly mounted a pin 46 whose flat head 47 is hardened and ground plane. In the right hand portion of the extension 45 is mounted a pivotable member 48 in which is rotatably but not slidably secured the reduced cylindrically smooth end of a screw 49 threaded through a block 50 rigidly mounted on the tilting table 16. The screw 49 thus serves to swing the table 34 arcuately to and fro on the tilting table 16. A V-block 51 having the vertical V-groove 52 opposite to the plane outer surface of the pin 46, is secured on the tilting table 16 at the left of the swing table extension 45. An accurately dimensioned and cylindrical, hardened adjustment cylinder 127 is positioned in the groove 52 to be abutted by the head 47 of the pin 46 under pressure of the screw 49 and thus accurately position the swing table 34 on the tilting table 16. The radius of motion of the center of the head 47 about the axis of the pin 41 is preferably the same as the radius of motion of the center of the head 30 of the pin 28 about the axis of the pins 20 and 22, for then identical variations in diameter of the cylinders 27 and 127 will produce identical angular shifts of the tables 16 and 34 respectively, and the cylinders may be interchangeable.

The swing table 34 bears on its upper face at the rear, a rigidly attached, transverse rail 53 having on its forward face a horizontal shoulder 54 and an undercut bevel 55. On the forward portion of the same table is rigidly mounted a transverse support rail 56. A removable plate 57 rests on the rail 56 and shoulder 54 and has a bevelled rear edge 58 matching and abutted against the bevel 55, and a like bevelled front edge 59. A block 60 is rigidly secured on the table 34 in front of the approximate center of the plate 57 and has mounted on it a second block 61 having in its under part a rectangular slot 62 to house and guide a rack 63 formed at its forward end with an undercut bevel 64 to match and be abuttable against the bevel 59 of the plate 57. A pinion 65 formed on or secured to a shaft 66 journalled transversely in the block 61, serves to advance or retract the rack toward or from the plate 57 as actuated by the handle lever 67 secured on the shaft 66. A spring clip 68 supported on a bracket 69 (not shown in Fig. 1 to avoid confusion) mounted on the table 34 serves to hold the lever 67 yieldingly up and the rack withdrawn from the plate 57. A heavy handle 70 on the lever serves to urge the rack against the plate 57 when the lever is down, to lock the plate securely and accurately in place against the rear bevel 55. A guide rail 71 is mounted transversely across the under side of the plate 57 a little in front of the rail 53; and this rail 71 abuts against and slides along a corresponding rail 72 mounted on the upper face of the table 34, these parts being so dimensioned and located that, when the plate 57 is unlocked from the bevel 55 by retraction of the rack 63, the plate 57 is easily slidable along the bevel 55 while prevented from rotation by the rails 71 and 72.

On the upper face of the plate 57 is mounted a work holder clamping device comprising a transverse rail 74 having an undercut bevel 75 and a support shoulder 76, together with a slablike support 77 abutted against the front face of the shoulder 76 and of equal height therewith. A clamp screw 78 is mounted in a bracket 79 formed on the support 77. These parts are so proportioned and related that the work holder proper 80, which is essentially a small rigid metal slab bevelled along opposite sides, may be clamped, as best shown in Fig. 2, between the bevel 75 and the slantingly disposed screw 78. The work in question here may be thought of as a generally rectangularly parallelopipedal bar 81 of crystalline quartz which is to be sawed into successive transverse slabs by the saw 11. Ordinarily such a bar is cemented to the flat upper face of a pad 82 which is cemented on the upper face of the work holder proper 80. The pad 82 is ordinarily a rectangle of plate glass interposed between the bar 81 and the holder 80 so that the saw may cut clear through the bar and into the pad without damage to the holder proper 80.

On the upper face of the swing table and at the right hand side near the rear is rigidly secured a pair of transverse, spaced, parallel rails 83 and 84 extending out to the right from the table. On these rails is mounted a slidable block 85 formed underneath with a key 86 extending down between the rails to prevent the block from turning on the rails. A bolt 87 passing up vertically between the rails and through the key and block, has a head 88 at the bottom abuttable against the under face of the rails and formed with an upstanding key portion 89 to be slidable between the rails and prevent rotation of the bolt. A knurled nut 90 on the upper end of the bolt serves to clamp the block in position on the rails. The left end of the block 85 is formed with a stop nose 91 abuttable against the vertical right edge face of the plate 57. A horizontally disposed yoke 92 is pivoted on the block 85 with the crossbar of the yoke normally resting on the nose 91 and formed with a stop shoulder 93 also abuttable against the right hand edge faces of the plate 57. The shoulder 93 overhangs and extends leftward beyond the nose 91 by a distance equal to the width of the kerf cut by the saw 11 plus the predetermined thickness of one slice to be cut from the bar 81. A handle 94 is provided on the yoke to lift the shoulder 93 out of engagement with the plate 57.

In operation, a quartz crystal bar 81 is cemented on the pad 82 on the work holder 80 in as accurate a predetermined orientation thereon as practically possible. The doing of this is no part of the present invention and so is not necessary to be described in detail here. It suffices to state that by the customary methods of doing this, the bar when in place on the plate 57 as described, is presented to the saw 11 in a fashion which will depart from the desired orientation with respect thereto by a matter of not more than thirty minutes of angle with respect to the axis of the pins 20 and 22 or with respect to the axis of the pin 41, or both.

The clamp nut 90 is loosened and the block 85 backed away to the right. The handle 67 is raised into the clip 68 to unlock the plate 57 by retracting the rack 63. The plate 57 is then slid until the right end of the bar 81 lies under the saw 11 (raised at this time) in position to have a thin slab or slice cut from the end of the bar. The plate 57 is then clamped in this position by bringing down the handle 67. The block 85 is slid to the left until the stop shoulder 93 abuts against the plate 57, and the block is locked in this position by means of the nut 90. The saw is then actuated to cut off the end slab or slice of the bar, and the saw is raised. The slice cut off is then examined by X-ray means and the amount of its departure from the desired orientation with respect to the crystal structure is determined with respect to the axis of the pins 20 and 22 and with respect to the axis of the pin 41.

At this time, it is assumed, the cylinders 27 and 127 are of such diameter that the tiltable table 16 is horizontal and at right angles to the plane of the saw and that the swing table 34 has its center line parallel to the plane of the saw. The screw 31 is manipulated to raise the tiltable table 16 by means of the collar 33. The cylinder 27 is interchanged for a similar cylinder of diameter differing by the amount needed to correct the angular error of the bar 81 about the axis of the pins 20 and 22 with respect to the saw, and the tiltable table 16 is then locked down on this cylinder by actuation of the screw 31. In similar fashion the cylinder 127 is interchanged for a similar cylinder of such diameter as will cause the swing table 34 to be moved about the pin 41 to correct the angular error of the bar 81 about the axis of the pin 41 with respect to the saw. The bar 81 is then oriented with extreme accuracy in the desired relation to the saw; and successive slices cut from the bar by the saw will have the sawed faces accurately oriented as desired in relation to the crystal structure of the material of the bar.

After each cut, the plate 57 is unlocked by lifting the handle 67, the shoulder 93 is lifted by the handle 94, the plate is moved over rightward to abut the nose 91, and the plate is locked again by lowering the handle 67. The plate has then been traversed to the right, without change of orientation of the bar with respect to the saw, by the width of the saw kerf plus the thickness of one slice to be cut, and is ready for the next slice to be cut. While this is being done, the nut 90 can be loosened, the block 85 slid to the right until the shoulder 93 can again drop down and engage against the edge face of the plate 57.

To give some idea of the accuracy of correction attainable by the means described, let the radius from the axis of the pins 20 and 22 to the axis of the V-groove 26 or the radius from the axis of the pin 41 to the axis of the V-groove 52 be 9.5 inches as in one actual case. Also let the parts be so proportioned and arranged that a cylinder 27 or 127 of diameter 0.5000 inch will make the tilting table 16 horizontal or the swing table 34 have its axis parallel to the plane of the saw. Then a change in diameter of the cylinder of 0.00575 inch will cause either table to deviate 2.5 minutes of angle; and a series of cylinders differing in steps of this amount will represent successive changes of angle of 2.5 minutes up to 30 minutes either way from the median or zero position. In this particular instance $$\text{cylinder diameter} = 2 \times \frac{0.603555 \pm 9.5 \tan D}{1.414222 + \sec D}$$

where D is the angle desired above or below the median position of the tilting table or to the right or left of the median position of the swing table.

What is claimed is:

1. A work supporting device for a machine tool which device comprises a stationary base table, a tilting table pivotable on the base table about an axis parallel thereto, a swing table pivotable on the tilting table about an axis perpendicular to the axis of pivoting of the tilting table on the base table, a V-block mounted on one of the two first named tables and facing the other, a plane contact face on the other of the two first named tables and facing the V-groove of the V-block, a cylindrical spacing element interposed between and resting against the sides of the V-groove on one side and the contact face on the other side, a second V-block mounted on one of the two last named tables and facing the other, a second plane contact face on the other of the two last named tables and facing the V-groove of the second V-block, a second cylindrical spacing element interposed between and resting against the sides of the second V-groove on one side and the second contact face on the other side, and work holding means mounted on the swing table, in combination with means to press the tilting table to hold the first named contact face and the sides of the first named V-groove firmly against the first named spacing element, and means to press the swing table to hold the second named contact face and the sides of the second named V-groove firmly against the second named spacing element.

2. A work supporting device for a machine tool which device comprises a stationary base table, a tilting table pivotable on the base table about an axis parallel thereto, a V-block mounted on one of the said tables and facing the other, a plane contact face on the other table and facing the V-groove of the V-block, a cylindrical spacing element interposed between and resting against the sides of the V-groove on one side and the contact face on the other side, and work holding means mounted on the swing table, in combination with means to press the tilting table to hold the contact face and the sides of the V-groove firmly against the spacing element.

3. A work supporting device for a machine tool which device comprises a tilting table pivotable about an axis parallel thereto, a swing table pivotable on the tilting table about an axis perpendicular thereto, a V-block mounted on one of the said tables and facing the other, a plane contact face on the other table and facing the V-groove of the V-block, a cylindrical spacing element interposed between and resting against the sides of the V-groove on one side and the contact face on the other side, and work holding means mounted on the swing table.

4. A work supporting device for a machine tool which device comprises a tilting table pivotable about an axis parallel thereto, a swing table pivotable on the tilting table about an axis perpendicular thereto, a V-block mounted on one of the said tables and facing the other, a plane contact face on the other table and facing the V-groove of the V-block, a cylindrical spacing element interposed between and resting against the sides of the V-groove on one side and the contact face on the other side, and work holding means mounted on the swing table, in combination with means to press the swing table to hold the contact face and the sides of the V-groove firmly against the spacing element.

BRUCE M. SMITH.